No. 672,446. Patented Apr. 23, 1901.
E. LANDVOIGT.
COFFEE OR TEA POT.
(Application filed Aug. 25, 1900.)
(No Model.)
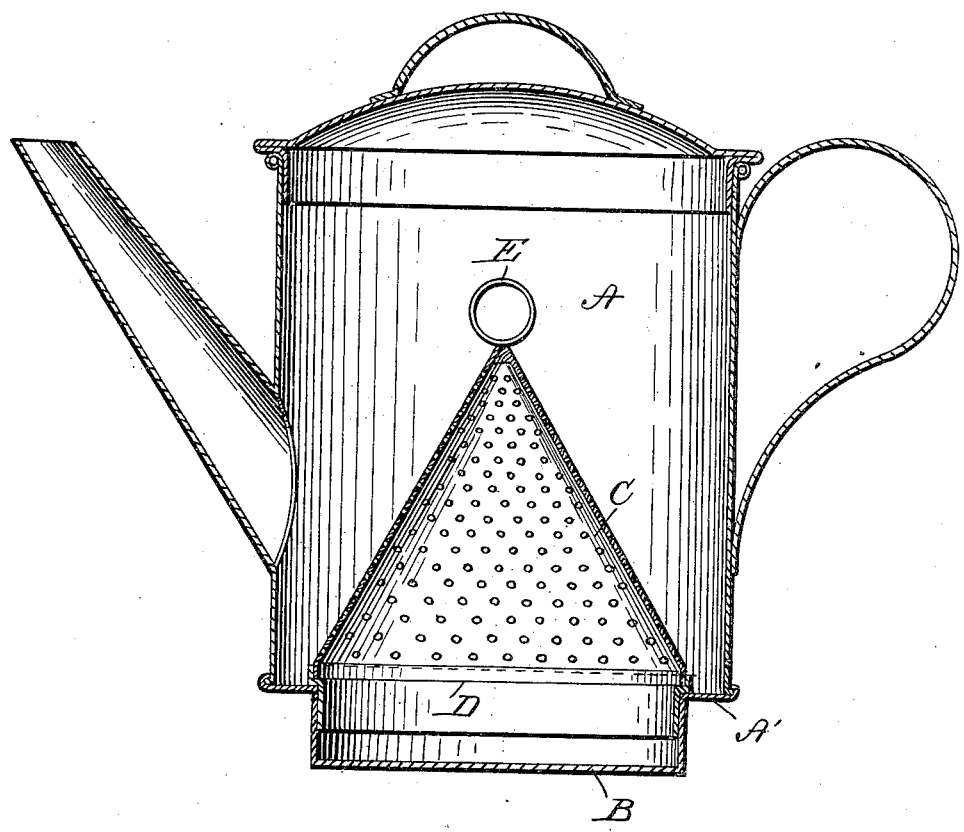
Witnesses
Franck L. Ourand
Parker H. Sweet Jr.
Inventor
Edward Landvoigt
By Parker H. Sweet Jr.
Attorney

UNITED STATES PATENT OFFICE.

EDWARD LANDVOIGT, OF WASHINGTON, DISTRICT OF COLUMBIA.

COFFEE OR TEA POT.

SPECIFICATION forming part of Letters Patent No. 672,446, dated April 23, 1901.

Application filed August 25, 1900. Serial No. 28,022. (No model.)

*To all whom it may concern:*

Be it known that I, EDWARD LANDVOIGT, a citizen of the United States, residing at Washington, in the District of Columbia, have invented certain new and useful Improvements in Coffee or Tea Pots; and I do hereby declare the following to be a full, clear, and exact description of the invention, such as will enable others skilled in the art to which it appertains to make and use the same.

My present invention has for its object to provide an improved novel and simplified construction of coffee and tea pots, whereby the ground coffee or tea-leaves are held below the surface of the water to obtain the full strength of the same, the escape of the grounds or residue prevented when the contents are being poured, and the aroma retained within the pot during the operation of boiling or steeping.

To the above ends my invention consists in the novel details of construction and general arrangement of parts, as will be hereinafter fully described, and pointed out in the claim.

In the accompanying drawing the figure shown represents a vertical longitudinal section of my improved device.

In carrying out my invention the main body of the coffee-pot A is of the ordinary construction, with the exception that the bottom A' thereof is provided with a centrally-depressed portion or circular recess B for the reception of the ground coffee or tea-leaves.

C represents a perforated or wire-gauze cover, preferably cone-shaped, having the bottom thereof provided with a metallic rim or edge D, which is adapted to fit snugly within the circumference of the recess B, as shown in the drawing, to retain the coffee-grounds or tea-leaves within the same.

In the operation of my improved device I have found it preferable in order to obtain the best results that the coffee be ground to a coarse grain, for the reason that when the desired quantity is placed in the recess B and the cone-shaped hood or cover is adjusted in position thereon the constant circulation of the water during the process of boiling continually stirs up and keeps the coarse grains of coffee in motion within said hood or cover until its entire strength has passed into the boiling water, and as the water must always be above the top of the cone-shaped hood the full aroma of the coffee is retained within the pot until its contents are poured.

The perforated or wire-gauze cover C is provided at its upper end with a loop or ring E to permit of its easy withdrawal from the recess B when it is desired to empty the coffee-grounds or other residue from the receptacle.

Having thus described my invention, I claim as new and desire to secure by Letters Patent—

A coffee or tea pot having the bottom thereof provided with a centrally-depressed portion or recess B, for the reception of the ground coffee or tea-leaves, and the inclosing wire-gauze cover C, adapted to fit within said recess B, substantially as specified.

In testimony whereof I affix my signature in presence of two witnesses.

EDWARD LANDVOIGT.

Witnesses:
 PARKER H. SWEET, Jr.,
 SAML. A. DRURY.